(12) United States Patent
Stafford et al.

(10) Patent No.: US 8,730,354 B2
(45) Date of Patent: May 20, 2014

(54) OVERLAY VIDEO CONTENT ON A MOBILE DEVICE

(75) Inventors: Jeffrey R. Stafford, Redwood City, CA (US); Steven Osman, San Francisco, CA (US); Yunpeng Zhu, Foster City, CA (US)

(73) Assignee: Sony Computer Entertainment Inc, Tokyo (JP)

( * ) Notice: Subject to any disclaimer, the term of this patent is extended or adjusted under 35 U.S.C. 154(b) by 95 days.

(21) Appl. No.: 12/835,645

(22) Filed: Jul. 13, 2010

(65) Prior Publication Data

US 2012/0013770 A1   Jan. 19, 2012

(51) Int. Cl.
*H04N 5/262* (2006.01)
(52) U.S. Cl.
USPC ......................................................... 348/239
(58) Field of Classification Search
USPC ......................................................... 348/239
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger | |
| 5,128,671 A | 7/1992 | Thomas, Jr. | |
| 5,528,265 A | 6/1996 | Harrison | |
| 6,157,368 A | 12/2000 | Faeger | |
| 6,375,572 B1 | 4/2002 | Masuyama | |
| 2002/0059604 A1 | 5/2002 | Papagan | |
| 2002/0085097 A1 | 7/2002 | Colmenarez et al. | |
| 2002/0140855 A1 | 10/2002 | Hayes | |
| 2002/0186676 A1 | 12/2002 | Milley et al. | |
| 2003/0152366 A1 | 8/2003 | Kanazawa et al. | |
| 2003/0156144 A1 | 8/2003 | Morita | |
| 2004/0212589 A1 | 10/2004 | Hall et al. | |
| 2005/0108026 A1 | 5/2005 | Brierre | |
| 2005/0123267 A1 | 6/2005 | Tsumagari | |
| 2006/0038833 A1* | 2/2006 | Mallinson et al. | 345/633 |
| 2007/0169115 A1 | 7/2007 | Ko et al. | |
| 2008/0215679 A1* | 9/2008 | Gillo et al. | 709/204 |
| 2009/0055383 A1* | 2/2009 | Zalewski | 707/5 |
| 2009/0327894 A1 | 12/2009 | Rakib et al. | |
| 2010/0100581 A1 | 4/2010 | Landow et al. | |
| 2010/0222102 A1 | 9/2010 | Rodriguez | |
| 2010/0275235 A1 | 10/2010 | Joo et al. | |

FOREIGN PATENT DOCUMENTS

| | | |
|---|---|---|
| EP | 1053642 | 11/2000 |
| WO | 2004-034281 | 4/2004 |
| WO | WO 2008/056180 A2 | 5/2008 |
| WO | WO 2010/020739 A1 | 2/2010 |

OTHER PUBLICATIONS

PCT Application No. PCT/US2011/042456, International Search Report and Written Opinion, dated Nov. 4, 2011, 12 pages.

(Continued)

*Primary Examiner* — Usman Khan
(74) *Attorney, Agent, or Firm* — Kilpatrick Townsend & Stockton LLP

(57) ABSTRACT

Methods, systems, and devices are described for providing overlay content to be placed over captured video content for display on a mobile device. In one embodiment, a system includes a video display, such as a TV, that displays video content. A mobile device with an integrated video camera and display may capture video data which includes the video content from the video display. The location of the video content within the captured video data may be tracked. The mobile device may access overlay content, and display the accessed overlay content over the tracked video content.

18 Claims, 11 Drawing Sheets

(56) References Cited

OTHER PUBLICATIONS

Bolt, R.A., "Put-that-there: voice and gesture at the graphics interface", Computer Graphics, vol. 14, No. 3 (ACM SIGGRAPH Conference Proceedings) Jul. 1980, pp. 262 270.

DeWitt, Thomas and Edelstein, Phil, "Pantomation: A System for Position Tracking," Proceedings of the 2nd Symposium on Small Computers in the Arts, Oct. 1982, pp. 61-69.

Mark Toner, Abstract of dissertation provided by Mr. Toner and purported to be maintained at Liverpool University, 1 page.

\* cited by examiner

OVERLAY VIDEO CONTENT ON A MOBILE DEVICE

CROSS-REFERENCES

This application is related to U.S. patent application Ser. No. 12/835,657, entitled "SUPPLEMENTAL VIDEO CONTENT ON A MOBILE DEVICE", filed concurrently herewith, and U.S. patent application Ser. No. 12/835,671, entitled "POSITION-DEPENDENT GAMING, 3-D CONTROLLER, AND HANDHELD AS A REMOTE", filed concurrently herewith, each of which is incorporated by reference herein in their entirety for all purposes.

BACKGROUND

The present invention relates to video display in general and, in particular, to overlaying additional content on captured video. Many movies and other video content on video discs contain additional content. This additional content often includes behind the scene features, actor/director information, outtakes, subtitles, etc. Typically, much of this additional content is only accessible from the opening menu of the disc, and gets played in isolation and appears out of context from the movie.

Currently, some formats allow a portion of this additional content to be placed over the video content during the playing of the video content (e.g., subtitles may be overlaid on the movie while it is being played). However, this overlaid information may interfere with the main picture, and may not be desirable for others watching a movie (e.g., other family members). There may, therefore, be a need in the art to allow additional content to be overlaid on video content for display to one or more individual viewers, without displaying the additional content to all of those watching the video content on the video display.

SUMMARY

Methods, systems, and devices are described for providing overlay content to be placed over captured video content for display on a mobile device. In one embodiment, a system includes a video display (e.g., a TV) that displays video content (e.g., a movie) from a video source (e.g., a video disc player or other console device). A mobile device with an integrated video camera and display may capture video data which includes the video content from the video display. The location of the video content within the captured video data may be tracked. The mobile device may access overlay content, and display the accessed overlay content over the tracked video content.

In some embodiments, markers may be used to orient the mobile device with respect to the TV or other display. The markers may include video markers in the video content or physical markers on or relative to the display, or may be any other orienting marker. When the video content is located by the mobile device, the device may display augmented or supplemental content (text, animations, information, etc.) over the view of the video content being displayed on the mobile device. The overlay content may include advertising, or the overlay content may be specific to the video content, and in particular may be specific to the temporal position within the video content. There are various ways to convey the temporal position to the mobile device. For example, the markers may include codes that may be used to identify the video content and temporal position therein, and this information may be used to find the correct overlay content and ensure that this overlay content is properly synchronized with the video content. The overlay content may be obtained by the mobile device from a console device or a network (e.g., a local or remote overlay content database), or may be installed on the mobile device.

Some embodiments include a method for displaying overlay content. Captured video data includes video content from a video display. The video content in the captured video data is tracked. Overlay content is accessed, and displayed over the tracked video content. In one embodiment, the video content is tracked by locating one or more markers in the video content. The video content may be identified, and the overlay content selected based on the identified video content. A temporal position in the video content may be identified as well, and the overlay content selected based on the temporal position in the video content. The video content and/or temporal position may also be identified using the markers.

In some embodiments, a device includes a processor module, a display, and a video camera configured to capture video data including video content from a second video display (e.g., a TV) distinct from the device. Memory on the device may include instructions that, when executed by the processor module, cause the device to track the video content in the captured video data, access overlay content, and output the accessed overlay content overlaid on the tracked video content on the device display.

A mobile device may include a video input to capture the video content for display. The video input may be fed by video outputs from a video source used to feed the display(s).

Another set of embodiments includes a method for identifying overlay content. Video data captured with a video camera integrated into a mobile device is received, the video data including video content captured from a video display. The video content captured from the video display is identified, and overlay content to be displayed over the video content is accessed. The overlay content in this set of embodiments is selected based on the identified video content.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
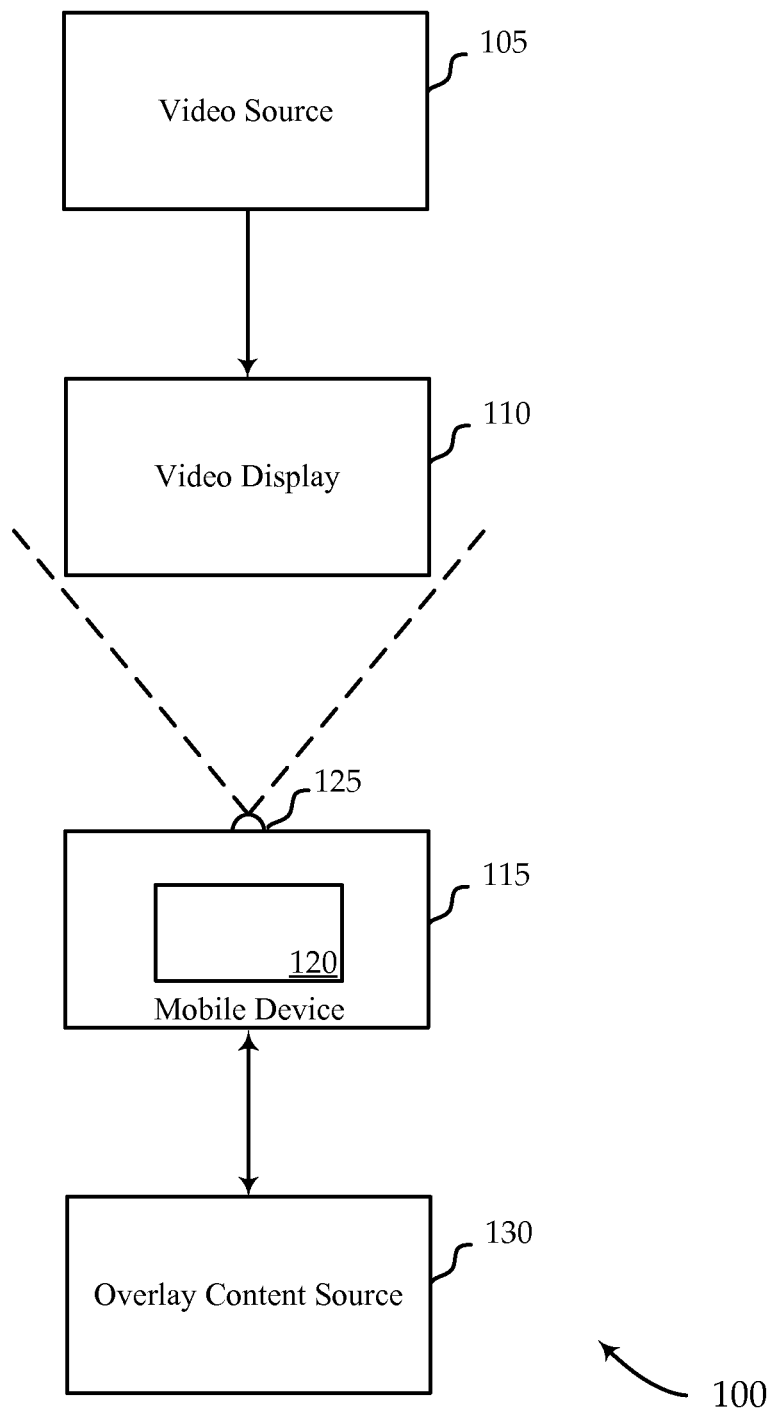
FIG. 1 is a block diagram of a system to provide overlay content on a mobile device according to various embodiments of the invention.

Methods, systems, and devices are described for providing overlay data to be placed over captured video content for display on a mobile device. In one embodiment, a system includes a video display that displays video content (such as a movie) from a video source (e.g., a video disc player). A mobile device with an integrated video camera may capture video data, which includes the video content from the video display. The location of the video content within the captured video data may be tracked. The mobile device may access overlay content, and display the accessed overlay content over the tracked video content.

This description provides examples only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Systems, devices, methods, and software are described for the display of overlay content. In one set of embodiments, shown in FIG. 1, the system 100 includes a video source 105, video display 110, mobile device 115, and overlay content source 130. Each of these components of the system 100 may be in connection with each other (either directly, wirelessly, via a wired or wireless network, etc.). The mobile device 115 includes a display 120 and a video camera 125.

The video source 105 may be a video disc player, a video game console, the Internet, a cable headend, or another video source. The video source 105 transmits video content to the video display 110. In some embodiments, the video source 105 and the overlay content source 130 may be, in whole or in part, the same device or system. As noted, the connection between the video source 105 and video display 110 may be direct, or via a network connection. The video display 110 may be a TV, video monitor (e.g., a liquid crystal display or plasma display), or other video display. The video content may, for example, be a movie, TV show, video game, web content, or other form of video content.

As noted, the mobile device 115 includes an integrated video camera 125 and display 120. The video camera 125 may be an outward facing camera on a mobile device 115, facing the opposite direction from the display 120, or in another direction as applicable. The mobile device 115 may be a mobile phone, personal digital assistant (PDA), portable video player, portable multimedia player, portable digital video disc (DVD) player, laptop PC, portable game console, game controller, video camera, or other digital electronic device.

The video camera 125 captures video data, and the video data includes the video content from the video display 110. Thus, the captured video data may include additional video surrounding the captured video content of the video display 110. The mobile device 115 tracks the video content within the captured video data. The mobile device 115 accesses overlay content, and displays the accessed overlay content over a portion of the tracked video content or anywhere on the mobile device display 120.

To track the video content, the mobile device 115 may identify the size of the video content, and the position and orientation of the video content relative to the mobile device (or position and orientation of the mobile device 115 relative to the display). In some embodiments, the video content displayed on the video display 110 includes one or more markers formatted to allow the mobile device 115 to track the video content within the captured video data. The marker may be placed in the corners of the video content, and could be a pattern of dots or squares (akin to a barcode). A variety of on-screen markers may be used (e.g., codes, graphics, numbers, letters, digital watermarks, or encoded images). Encoded audio may also be used to serve as markers. The video display 110 itself, or attachment thereto, may also serve as a marker.

The markers may have other functionality, alternatively or in addition to serving as anchors for tracking. Each pattern in a marker may represent a different value, such as a different binary representation. There may be one or more values associated with each marker in video content. The mobile device 115 may capture video content, locate the marker, and identify the value. Therefore, the video content displayed on the video display 110 may include a marker identifying the video content. The mobile device 115 may identify the video content based on markers, and the overlay content (e.g., text, animations, graphic enhancements (e.g., 2D or 3D enhancements), advertisements, hyperlinks, and other information) may be selected based on an identification of the video content.

Some of the values associated with video content may change in a given marker over time. The video content displayed on the video display 110 may therefore include a marker identifying the temporal position within particular video content. Since video changes over time, a time code may allow the overlay content to be synchronized with the movie or other video content. The mobile device 115 may process the marker to identify the temporal position within the video content. The overlay content may be selected in response to the temporal position of the video content (e.g., tied to particular scenes, actors, etc.). Thus, the pattern or the marker may change over time to show time progression, status, or other time-variable indicators. This may allow a mobile device 115 to get a tight synchronization with the video content on the video display 110. There may, but need not be, communication between the video source 105 and mobile device 115 for purposes of synchronization. Codes could update at a variety of rates, by way of example: 24 frames per second, or every ¼ second, every three seconds, etc., up to 10-15 seconds or more, depending upon the type of information to be displayed. The mobile device 115 may know the intervals in advance, so once there is synchronization, the mobile device 115 may only need to perform search processing at the intervals.

Figure 2:
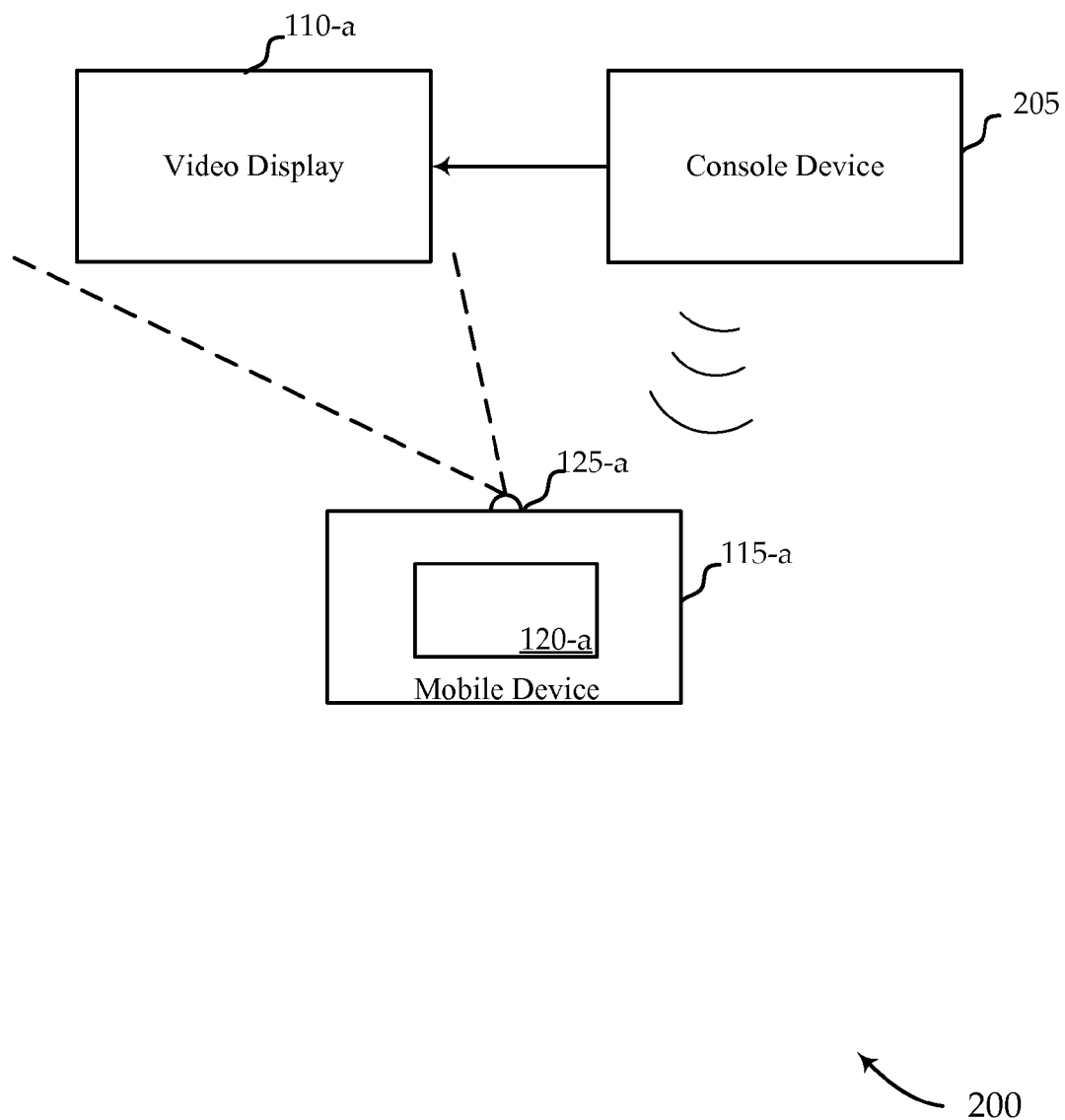
FIG. 2 is a block diagram of a system to provide overlay content to a mobile device delivered from a console device according to various embodiments of the invention.

In another set of embodiments, shown in FIG. 2, a system 200 includes a console device 205, video display 110-a, and mobile device 115-a. This system 200 may be an example of the system 100 of FIG. 1. The console device 205 may, for example, be a video disc player or a video game console (and may be the video source of FIG. 1). In one embodiment, the console device 205 is directly connected with the video display 110-a. The console device 205 may be in wireless communication with the mobile device 115-a. The mobile device 115-a includes a display 120-a and a video camera 125-a.

Consider an example wherein the console device 205 is playing a video disc, and transmitting video content from the disc for display over the video display 110-a. The video camera 125-a captures video data, and the video data includes the video content from the video display 110-a. The mobile device 115-a tracks the video content within the captured video data. The mobile device 115-a receives overlay content wirelessly from the console device 205, and displays the accessed overlay content over at least a portion of the tracked video content on the mobile device display 120-a.

Thus, in some embodiments, the console device 205 has augmented overlay content (which may be on the video disc itself, or accessed remotely over a network). Because the console device 205 provides both the video content to be displayed and overlay video content, this may facilitate the identification and temporal position of the video content (e.g., without the use of markers). In some embodiments, the mobile device 115-a may control or otherwise select the particular type of overlay content to be displayed on the mobile device display 120-a.

Figure 3:
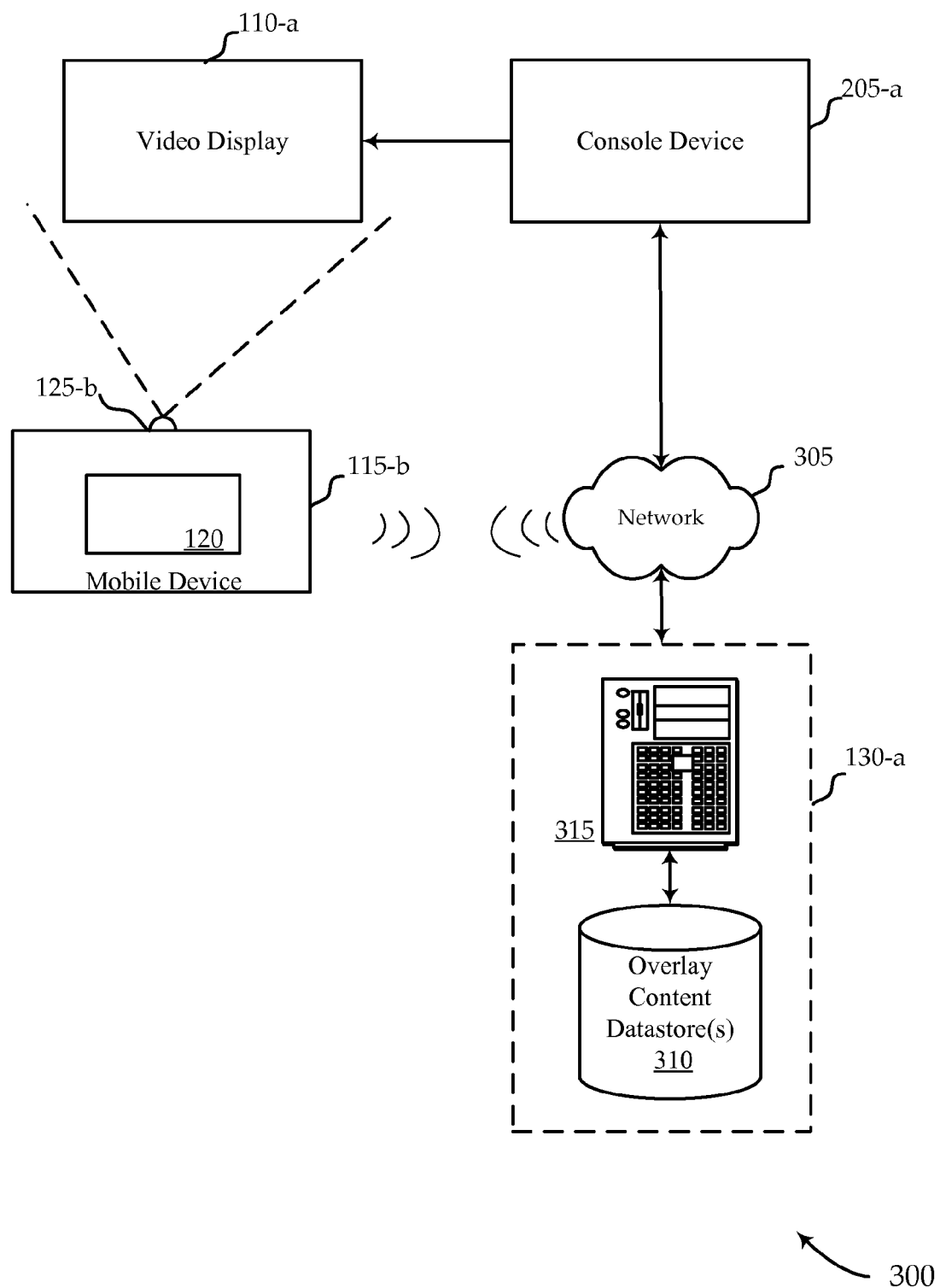
FIG. 3 is a block diagram of a system to provide overlay content to a mobile device delivered from an overlay content datastore according to various embodiments of the invention.

In another set of embodiments, shown in FIG. 3, a system 300 includes a console device 205-a, a video display 110-a, a mobile device 115-b, a network 305, overlay content datastore(s) 310, and an overlay content server 315. This system 300 may be an example of the system 100 of FIG. 1 (e.g., overlay content datastore(s) 310 and overlay content server 315 may be an overlay content source 130-a, such as the overlay content source 130 of FIG. 1). In one embodiment, the console device 205-a is directly connected with the video display 110-a. The mobile device 115-a may be wirelessly connected to a network 305, and in communication with overlay content datastore(s) 310 and overlay content server 315 through the network 305. The console device 205-a may be in communication with the network 305, and in communication with overlay content datastore(s) 310 and overlay content server 315 through the network 305.

In one example, the console device 205-a is playing a video disc, and transmitting video content from the disc for display over the video display 110-a. The video camera 125-b captures video data, and the video data includes the video content from the video display 110-a. The mobile device 115-b tracks the video content within the captured video data. The mobile device 115-b accesses overlay content via the network 305 from overlay content datastore(s) 310 and overlay content server 315. The mobile device 115-b displays the overlay content over at least a portion of the tracked video content on the mobile device display 120.

The overlay content may be related, or unrelated, to the video content. For example, in some embodiments, the overlay content is an advertisement (e.g., text, animations, graphics, hyperlinks, or other information) that is unrelated or independent from the video content. In other embodiments, the video content may be known (e.g., identified via console device 205-a or mobile device 115-b transmission to the overlay content server 315), but the temporal position may be unknown. The overlay content server 315 may deliver non-time specific overlay content to the mobile device 115-b.

In still other embodiments, the overlay content server 315 may identify the temporal position of the video content. This may be learned via communication with the console device 205-a, or the mobile device 115-b (e.g., the mobile device 115-b may transmit information to the overlay content server 315 from the markers discussed in more detail elsewhere). The overlay content server 315 accesses the overlay content datastore(s) 310 to retrieve overlay content related to the video content being captured by the mobile device 115-b. This content may be delivered to the mobile device 115-b for overlay during time-specific portions of the video content. It is also worth noting that overlay content may be pre-loaded onto the mobile device 115-b (e.g., from local or remote storage, such as the overlay content datastore(s) 310).

The overlay content server 315 may include one or more server computers, workstations, web servers, or other suitable computing devices. The overlay content server 315 may be fully located within a single facility or distributed geographically, in which case a network may be used to integrate different components.

Figure 4:
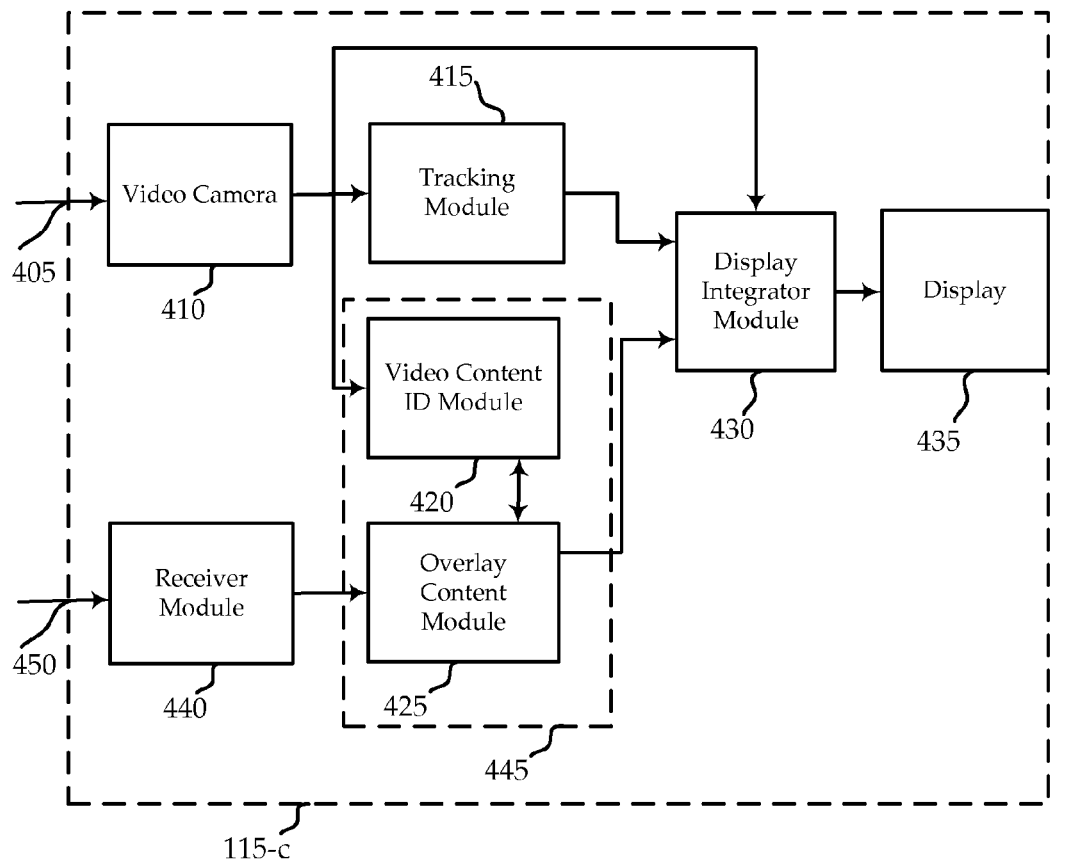
FIG. 4 is a block diagram of a mobile device configured to display overlay content over captured video content according to various embodiments of the invention.

FIG. 4 is a block diagram 400 illustrating a mobile device 115-c for the display of overlay content according to various embodiments of the invention. This may, but need not be, the mobile device 115 of FIG. 1, 2, or 3. The mobile device 115-c may include a video camera 410, tracking module 415, video content ID module 420, overlay content module 425, display integrator module 430, display 435, and receiver module 440. In some embodiments, a mobile device 115-c may include only a subset of these components, and it is further worth noting that some of the functionality discussed may be performed by other devices in communication with the mobile device 115-c.

All or part of the functionality of each component may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions may also be implemented, in whole or in part, with instructions embodied in a memory, formatted to be executed by one or more general or application-specific processors.

Video content 405 being displayed on a TV or other display device may be captured by the video camera 410. The tracking module 415 may track the video content within the captured video. The tracking module 415 may track the video content by identifying the size and location of the video content within the captured video data, and the position and orientation of the video display relative to the mobile device. This tracking may be performed using the markers discussed elsewhere herein.

Video can also be captured directly from output ports using cables connected to the output ports of the source. Captured video may be in analog, digital, or hybrid analog/digital formats. Captured video may be fed directly to the tracking module 415, bypassing the video camera 410.

The video content ID module 420 may decode the markers, or otherwise identify the captured video content. In some embodiments, the video content ID module 420 also identifies the temporal position within video content. The overlay content module 425 accesses overlay content. The accessed overlay content may be tied to the video content, and further may be tied to the temporal position within the video content. In some embodiments, there are a number of overlay content options at a given temporal position. The video content ID module 420 and the overlay content module 425 (and tracking module 415) may be an integrated module 445; alternatively, some or all of this functionality may be located off the mobile device 115-c (see, e.g., the discussion of the overlay content datastore(s) 310 and overlay content server 315 of FIG. 3). Thus, the receiver module 440 of the mobile device 115-c may receive overlay content 450 (in advance or in real-time). This overlay content may be received from a local console device (e.g., console device 205 of FIG. 2) or from a local or remote overlay content datastore (e.g., datastore 310 of FIG. 3).

The display integrator module 430 receives the video captured by the video camera 410, or through direct output cables from the video source, and information on location, size, position, and/or orientation of the video content from the tracking module 415. The display integrator module 430 receives the overlay content from overlay content module 425. The display integrator module 430 may scale and orient the overlay content. The display integrator module 430 overlays the accessed overlay content over at least a portion of the tracked video content, and forwards the integrated video to the display 435.

There is a variety of overlay content that may be provided, including actor identification and information, location background, trivia, player statistics, fantasy information, quizzes, hidden "easter eggs" to be discovered, links to multiple angles, and any other bonus features. These may be in the form of text, animations, graphic enhancements (e.g., 2D or 3D enhancements), advertisements, hyperlinks, etc.

Figure 5:
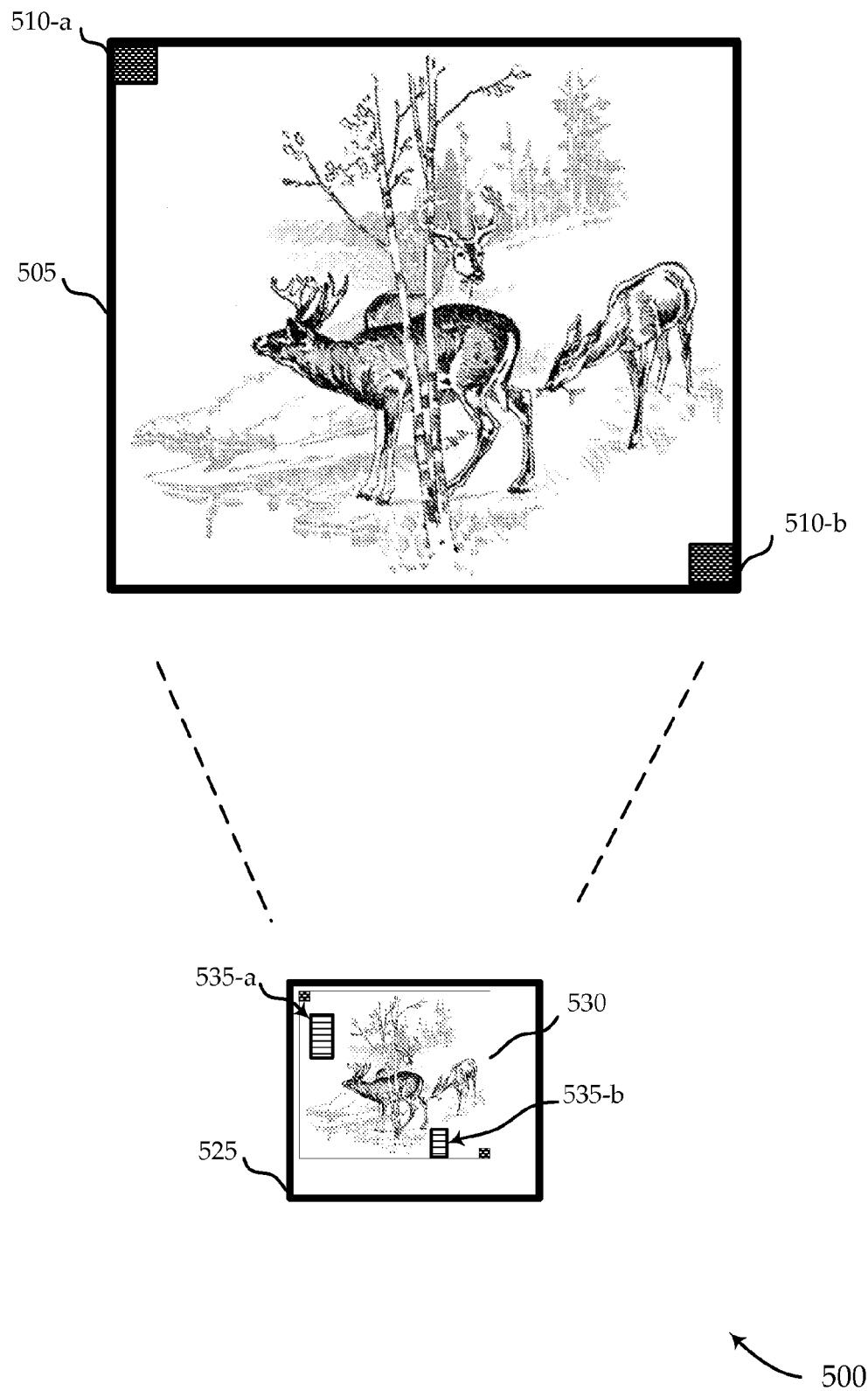
FIG. 5 is a diagram illustrating the display of overlay content over captured video content according to various embodiments of the invention.

Turning to FIG. 5, an example set of images 500 illustrating various displays are used to show various novel aspects. Assume that image 505 is video content on a display (e.g., the video display 110 of FIG. 1, 2, or 3). In the image 505, there are markers 510 placed in certain corners. As noted above, the markers 510 may be a pattern of dots or squares (akin to a barcode). However, in other embodiments, a variety of on-screen markers may be used (e.g., codes, graphics, numbers, letters, digital watermarks, or encoded images). The markers 510 may have other functionality, alternatively or in addition to serving as anchors for tracking. Each pattern in a marker 510 may represent a different value, such as a different binary representation. There may be one or more values associated with each marker 510 in video content, and the markers may be changed over time to identify temporal position in addition to content.

Image 525 illustrates captured video, while image 530 (within image 525) illustrates the captured video content from a video display (i.e., the captured image 505). The markers 510 may be processed to track image 530 within image 525, and may further be processed to identify the video content and the temporal position therein. Based on one or more of the aforementioned factors, overlay content 535 may be selected. As noted previously, the overlay content may be text, animations, graphic enhancements (e.g., 2D or 3D enhancements), advertisements, hyperlinks, and so on. The overlay content may automatically appear in some embodiments, while in other embodiment the content is user-selectable.

Figure 6A:
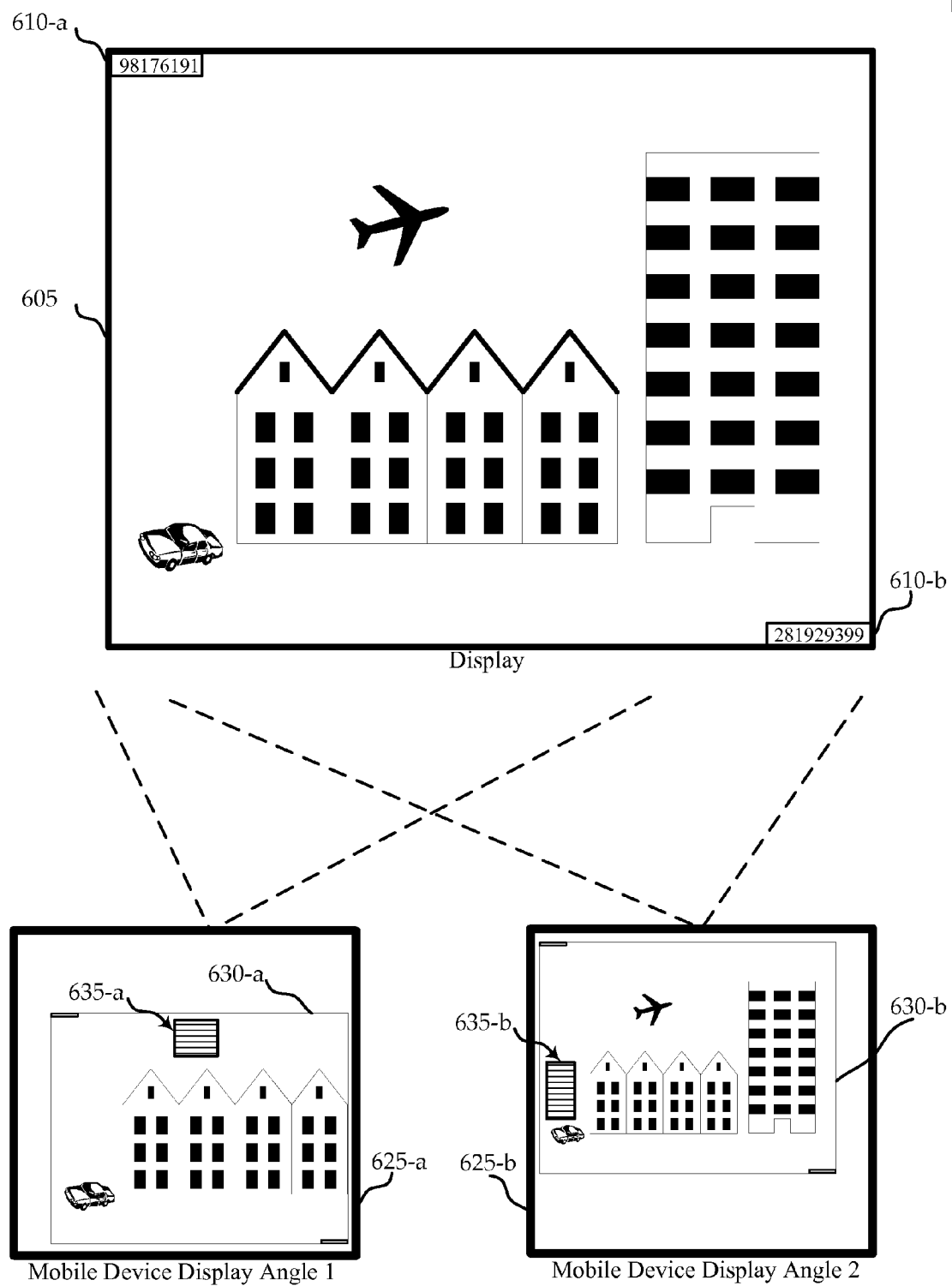
FIG. 6A is a diagram illustrating various displays of overlay content over captured video content according to various embodiments of the invention.

Turning to FIG. 6A, an example set of images 600 illustrating various displays are again used to show various novel aspects. Assume that image 605 is video content on a display (e.g., the video display 110 of FIG. 1, 2, or 3) or fed through output connections from a video source or the display. In the image 605, there are markers 610 identifying decimal codes placed in certain corners. As noted above, the markers 610 may, in other embodiments, be a variety of different screen markers. The markers 610 may have other functionality, alternatively or in addition to serving as anchors for tracking. Each code 610 may represent a different value to identify video content, and codes may change over time as well.

Images 625-a and 625-b illustrate captured video for different mobile devices capturing video from different angles and zooms, while images 630-a and 630-b illustrate the captured video content from a video display (i.e., the captured image 605). The markers 610 may be processed to track images 630-a and 630-b within images 625-a and 625-b, respectively. Different angles may be associated with different overlay content. For example, compare the position of overlay content 635-a with overlay content 635-b. In addition to providing different overlay content based on viewer angles, user-specific overlay data may also be provided. For example, different users may specify (through pre-selected preferences or real-time selection) which type of overlay content they would like to receive.

Figure 6B:
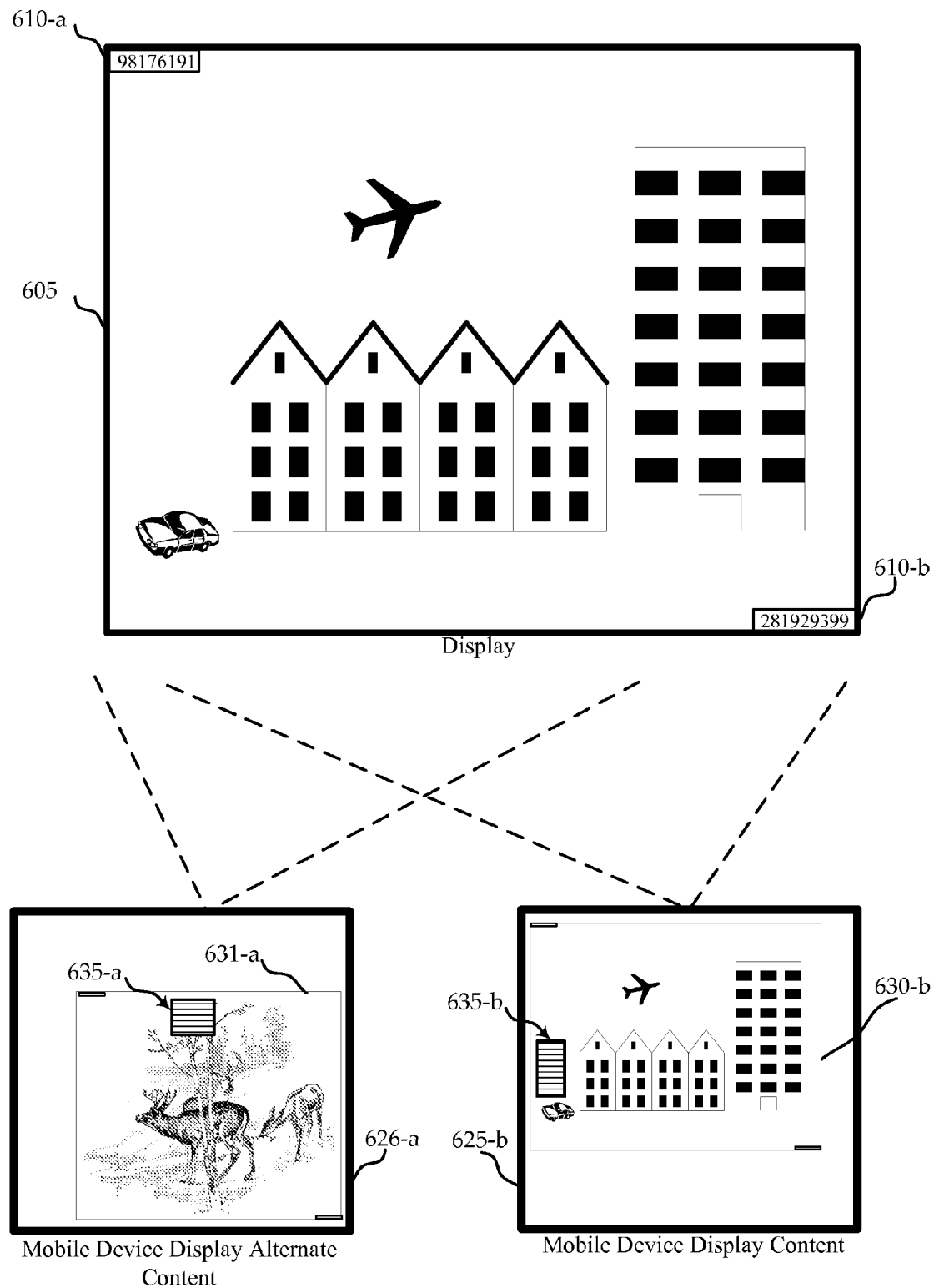
FIG. 6B is a diagram illustrating various displays of overlay content over non-related video content according to various embodiments of the invention.

FIG. 6B includes different, unrelated content on image 626-a of the left mobile device display. Overlay content 635-a is the same as in FIG. 6A, as it is based on content of display 605. Overlay content 635-a is overlaid over image 631-a, which is unrelated to the content of display 605. This can occur when a commercial is playing on image 605 and the viewer of the mobile device display wishes to watch another video but keep overlays for the main content available.

There are a number of additional ways to track video content within captured video, identify the video content, and/or identify the temporal position therein. For example, in some embodiments, a mobile device (e.g., mobile device 115 of FIG. 1, 2, 3 or 4) may have a low-resolution version of a movie, and search for those frames in order to sync to the movie. A hash of a low-resolution version of the movie may be stored at the device, and the device may perform image matching. The image matching can also be performed on a remote server or a video source, such as console device 205.

In other embodiments, an "invisible" watermark may be embedded in the video stream to provide for tracking and content identification. A digital watermark embedded in the content may be captured by a mobile device, and used to track the video content. The watermark may be in select, predictable areas of the screen, or across the entire screen to facilitate tracking to determine the outline of the screen in the image. In one embodiment, there are two watermarks, or mark portions, on the screen—one that corresponds to the anchor (e.g., a static mark that may be around or near the edge and stable), and one that corresponds to the code (e.g., changing over time—a modulated mark).

In some embodiments, the tracking and content identification may be embedded in the image. A Fourier transform of all or part of the scanned image may be performed, and the frequencies across the image analyzed. Information may be encoded in portions of the image not perceptible to humans (e.g., very high frequency images). Information may be embedded that relates to a watermark (e.g., defining the location of a watermark), or is independent from any watermark.

In still other embodiments, the tracking and content identification may be embedded in subtitles, logos, or other images. The information may also be in the sidebands of the audio, encoded at frequencies not perceptible to the human ear, but that can be detected using, for example, a Fourier transform. Combinations of image data and audio data may be used, as well. It is again worth noting that markers may be used to track the display, identify video content, and identify a temporal position. However, in some embodiments, the video content is not identified with the markers, and instead the overlay content may be independent of the video content (e.g., with an advertisement). Instead, the marker may dictate an advertising logo to display and a size/location of where to display it on the screen.

The markers may not be needed in each embodiment, as a mobile device may recognize and track the display in other ways (e.g., based on knowing a model and/or size of the display). In some embodiments, a sensor bar, stickers, or other physical attachments may be used to track the display. In other embodiments, the markers may be embedded in an extra angle or secondary version, as opposed to having the marker always embedded. Thus, a person who does not want the augmented experience may select the version without markers in such embodiments.

It is again worth noting that the overlay content may be downloaded in advance of when the video content is displayed (e.g., through a download store, or by copying content from the movie's video disc). Alternatively, some console devices may stream the overlay content to a mobile device over a wireless connection during the playback of the content and thus avoid preloading the portable device with the content. This can also be used as a method of synchronization. In still other embodiments, the overlay content may be streamed from a network.

Figure 7:
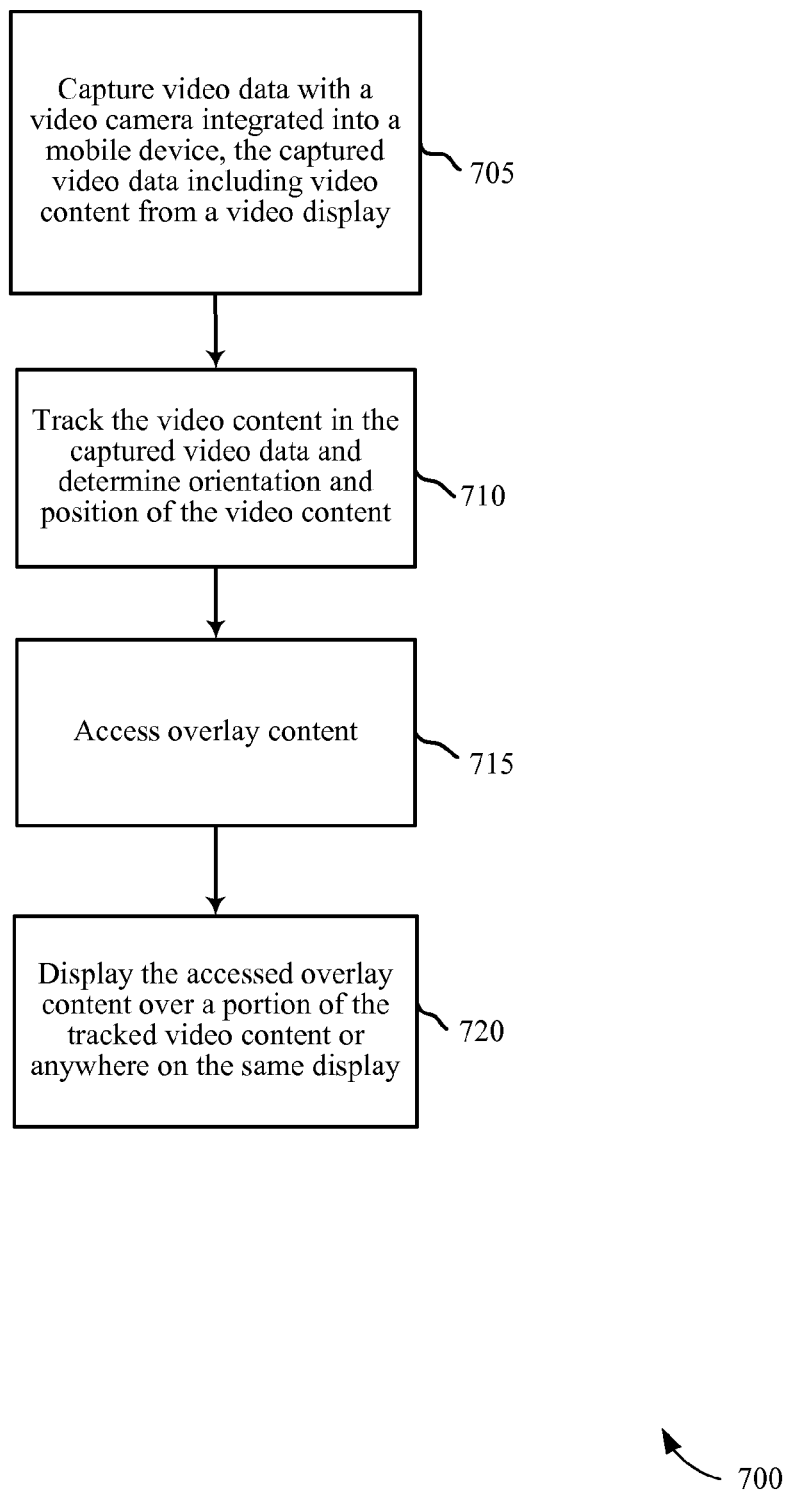
FIG. 7 is a flow chart of a process to provide overlay content on a mobile device according to various embodiments of the invention.

Referring next to FIG. 7, a flow chart is shown illustrating a method 700 to provide overlay content on a mobile device according to various embodiments of the invention. This method 700 may, for example, be performed in whole or in part by the system 100, 200, or 300 of FIG. 1, 2, or 3, the mobile device 115 of FIG. 1, 2, 3, or 4, the console device 205 of FIG. 2 or 3, or the overlay content server 315 of FIG. 3, and/or any combination thereof.

At block 705, video data is captured by a video camera integrated into a mobile device, the captured video data including video content from a video display. At block 710, the video content in the captured video data is tracked. At block 715, overlay content is accessed. At block 720, the accessed overlay content is displayed over at least a portion of the tracked video content on the mobile device display.

Figure 8:
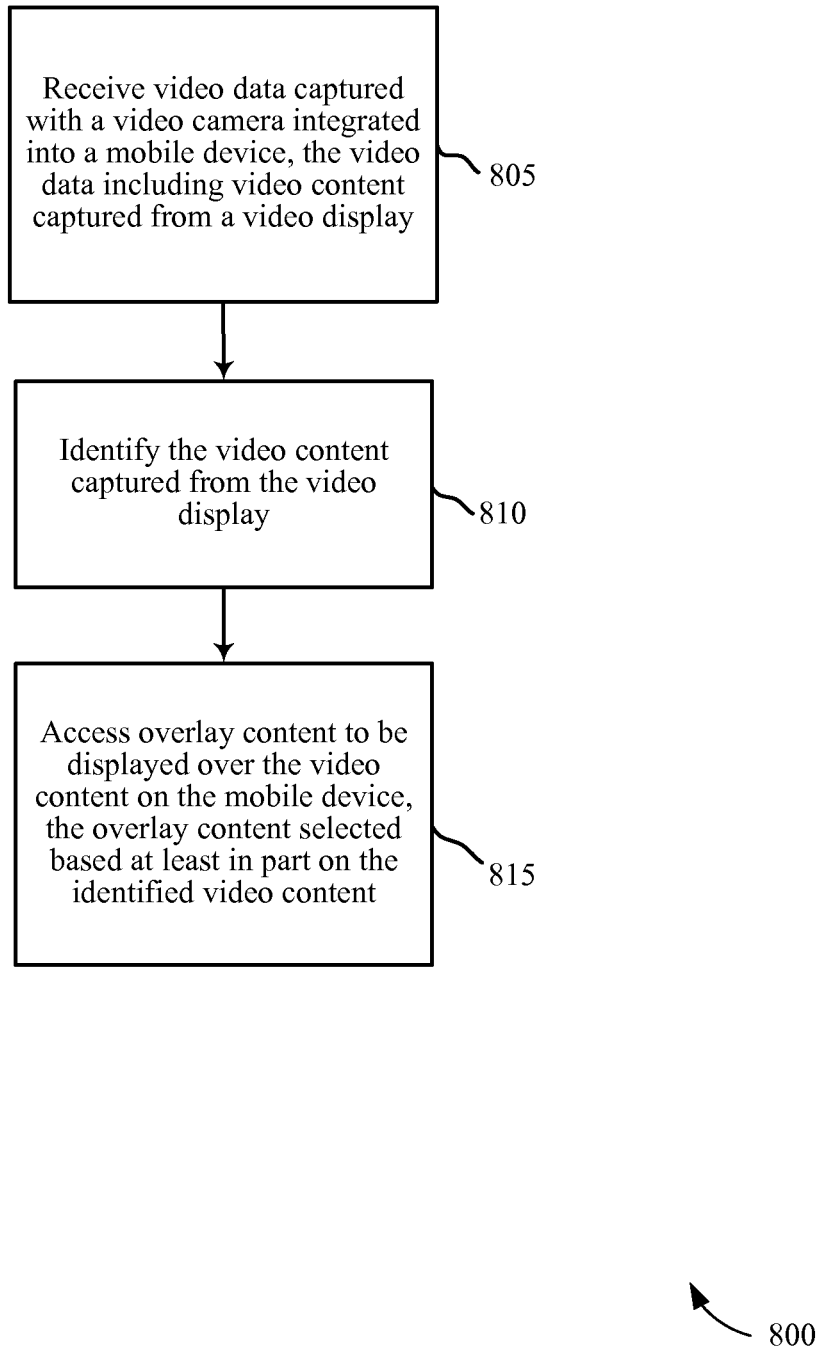
FIG. 8 is a flow chart of a process to identify overlay content for display on a mobile device according to various embodiments of the invention.

Referring next to FIG. 8, a flow chart is shown illustrating a method 800 to identify overlay content for display on a mobile device according to various embodiments of the invention. This method 800 may, for example, be performed in whole or in part by the system 100, 200, or 300 of FIG. 1, 2, or 3, the mobile device 115 of FIG. 1, 2, 3, or 4, the console device 205 of FIG. 2 or 3, or the overlay content server 315 of FIG. 3, and/or any combination thereof.

At block 805, video data captured with a video camera integrated into a mobile device is received, the video data including video content captured from a video display. At block 810, the video content captured from the video display is identified. At block 815, overlay content to be displayed over the video content is accessed, the overlay content selected based at least in part on the identified video content.

In some embodiments (not shown), the temporal position within the video content is identified, and the overlay content is further selected based on the temporal position. The video content within the captured video data may also be tracked, and the tracking may include identifying the relative position and orientation of the mobile device as it relates to the video content.

Figure 9:
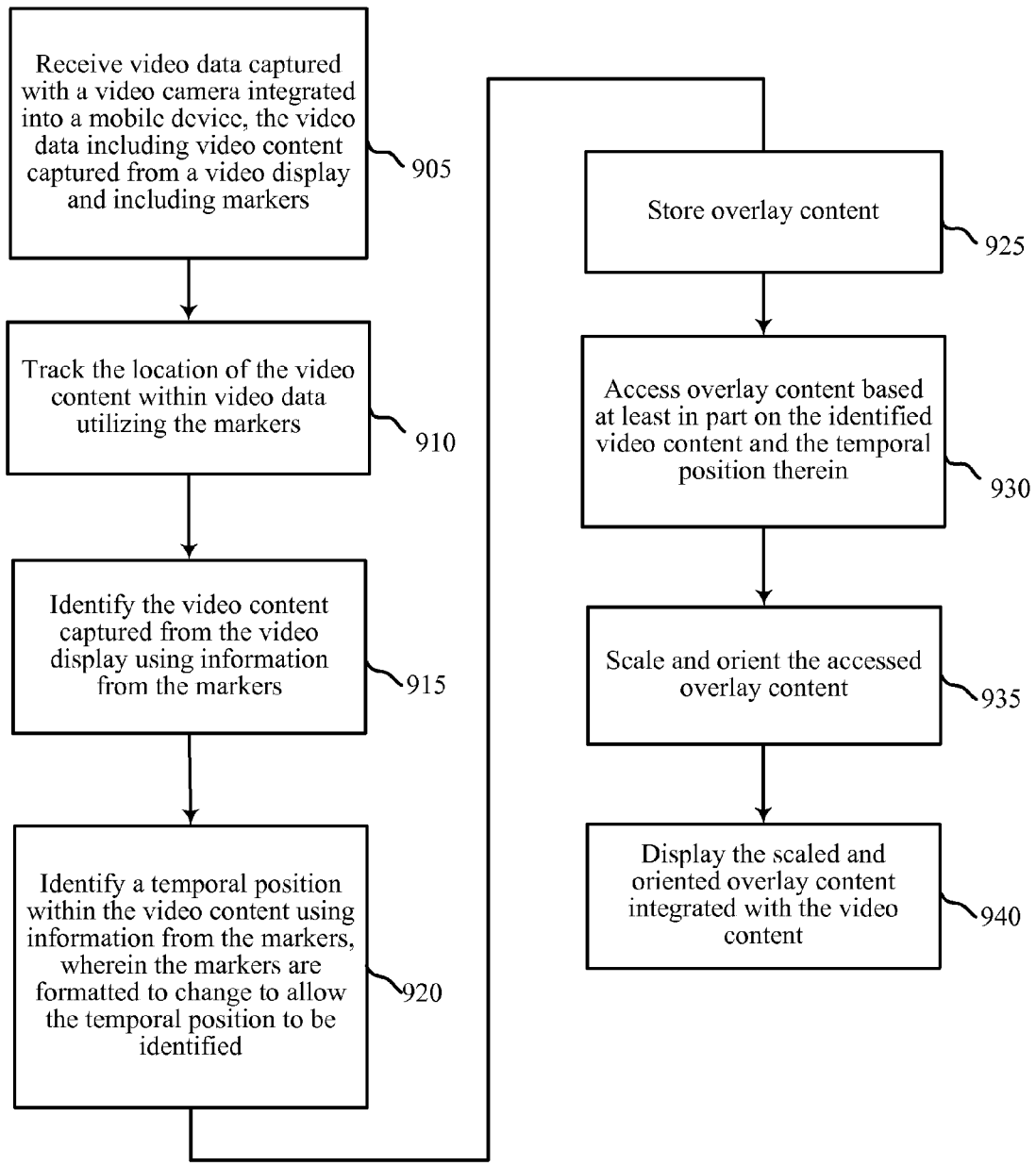
FIG. 9 is a flow chart of a process to identify overlay content for display on a mobile device over tracked video content according to various embodiments of the invention.

Referring next to FIG. 9, a flow chart is shown illustrating a method 900 to identify overlay content for display on a mobile device over tracked video content according to various embodiments of the invention. This method 900 may, for example, be performed in whole or in part by the system 100, 200, or 300 of FIG. 1, 2, or 3, the mobile device 115 of FIG. 1, 2, 3, or 4, the console device 205 of FIG. 2 or 3, or the overlay content server 315 of FIG. 3, and/or any combination thereof.

At block 905, video data captured with a video camera integrated into a mobile device is received, the video data including video content captured from a video display and including markers. In other embodiments, video data may be captured directly from analog, digital, or hybrid analog/digital outputs from a video source. At block 910, the location of the video content is tracked within the video data utilizing the markers. At block 915, the video content captured from the video display is identified using information from the markers. At block 920, a temporal position is identified within the video content using information from the markers, wherein the markers are formatted to change to allow the temporal position to be identified.

At block 925, overlay content is stored. At block 930, overlay content is accessed based at least in part on the identified video content and the temporal position therein. At block 935, the accessed overlay content is scaled and oriented. At block 940, the scaled and oriented overlay content is integrated with the video content and displayed.

Figure 10:
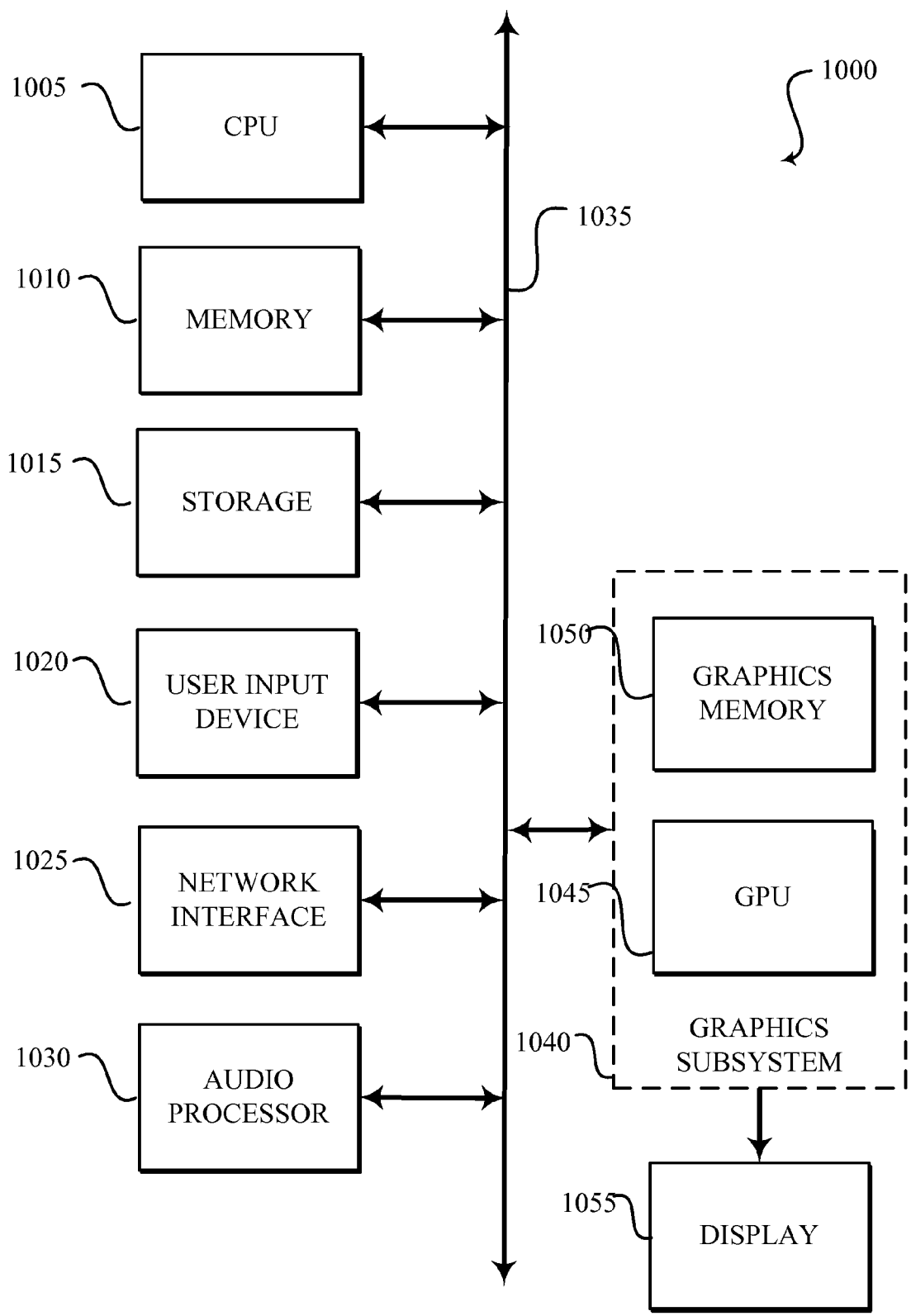
FIG. 10 illustrates components of an example device that can be used to perform aspects of the various embodiments.

FIG. 10 illustrates an example of a hardware system suitable for implementing a device in accordance with various embodiments. This block diagram illustrates a computer system 1000, such as a personal computer, video game console and associated display (e.g., console device 205 and video display 110 of FIG. 2, mobile device (e.g., mobile device 115 of FIG. 1, 2, 3, or 4), personal digital assistant, or other digital device, suitable for practicing embodiments of the invention. Computer system 1000 includes a central processing unit (CPU) 1005 for running software applications and optionally an operating system. CPU 1005 may be made up of one or more homogeneous or heterogeneous processing cores. Memory 1010 stores applications and data for use by the CPU 1005. Storage 1015 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1030 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1030 are connected via one or more data buses 1035.

A graphics subsystem 1040 is further connected with data bus 1035 and the components of the computer system 1000. The graphics subsystem 1040 includes a graphics processing unit (GPU) 1045 and graphics memory 1050. Graphics memory 1050 includes a display memory (e.g., a frame buffer) used for storing pixel data for each pixel of an output image. Graphics memory 1050 can be integrated in the same device as GPU 1045, connected as a separate device with GPU 1045, and/or implemented within memory 1010. Pixel data can be provided to graphics memory 1050 directly from the CPU 1005. Alternatively, CPU 1005 provides the GPU 1045 with data and/or instructions defining the desired output images, from which the GPU 1045 generates the pixel data of one or more output images. The data and/or instructions defining the desired output images can be stored in memory 1010 and/or graphics memory 1050. In an embodiment, the GPU 1045 includes 3D rendering capabilities for generating pixel data for output images from instructions and data defining the geometry, lighting, shading, texturing, motion, and/or camera parameters for a scene. The GPU 1045 can further include one or more programmable execution units capable of executing shader programs.

The graphics subsystem 1040 periodically outputs pixel data for an image from graphics memory 1050 to be displayed on display device 1055. Display device 1055 can be any device capable of displaying visual information in response to a signal from the computer system 1000, including CRT, LCD, plasma, and OLED displays. Computer system 1000 can provide the display device 1055 with an analog or digital signal.

In accordance with various embodiments, CPU 1005 is one or more general-purpose microprocessors having one or more processing cores. Further embodiments can be implemented using one or more CPUs with microprocessor architectures specifically adapted for highly parallel and computationally intensive applications, such as media and interactive entertainment applications.

The components of the system 100 of FIG. 1, system 200 of FIG. 2, or system 300 of FIG. 3 may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for augmented video, the system comprising:
   a video source configured to provide video content to a video display; and
   a mobile device with an integrated video camera and display, the mobile device configured to:
      capture video data including the video content from the video display through an image sensor of the integrated video camera, the video content from the video display having at least one marker identifying a temporal position within the video content, the temporal position corresponding to at least a portion of time in the video content;
      track the video content in the captured video data;
      access overlay content responsive to the temporal position of the video content, the temporal position identified by the at least one marker; and
      display the accessed overlay content with the tracked video content.

2. The system of claim 1, wherein the mobile device is configured to display the accessed overlay content over at least a portion of the tracked video content.

3. The system of claim 1, wherein the video source comprises a device selected from the group consisting of a video disc player and a video game console.

4. The system of claim 1, wherein the video content displayed on the video display includes a marker formatted to allow the mobile device to track the video content in the captured video data.

5. The system of claim 1, wherein a physical marker off the video display includes a marker formatted to allow the mobile device to track the video content in the captured video data.

6. The system of claim 1, wherein the overlay content is selected based at least in part on an identification of the video content.

7. The system of claim 6, wherein the mobile device is further configured to identify the video content.

8. The system of claim 1, wherein the video content displayed on the video display includes a marker identifying the video content.

9. The system of claim 1, wherein the mobile device is configured to track the video content by identifying a position and orientation of the video content relative to the mobile device.

10. The system of claim 1, further comprising:
an overlay content datastore, remote from the video display and mobile device and in communication with the mobile device, configured to store the overlay content, wherein the mobile device accesses the overlay content from the overlay content datastore.

11. The system of claim 1, wherein the video source is configured to store the overlay content, and the mobile device accesses the overlay content from the video source.

12. A computer-implemented method for augmented video, the method comprising:
capturing video data including video content from a video display, the video data captured through an image sensor of a video camera integrated into a mobile device, the video content from the video display having at least one marker identifying a temporal position within the video content, the temporal position corresponding to at least a portion of time in the video content;
tracking the video content in the captured video data;
accessing overlay content responsive to the temporal position of the video content, the temporal position identified by the at least one marker; and
displaying the accessed overlay content with the tracked video content.

13. The computer-implemented method of claim 12, wherein the tracking the video content in the captured video data comprises:
locating one or more markers in the video content, the markers formatted to allow the video content in the captured video data to be tracked.

14. The computer-implemented method of claim 12, further comprising:
identifying the video content in the identified video content; and
selecting the overlay content based at least in part on the temporal position in the identified video content.

15. The computer-implemented method of claim 12, wherein,
the video content displayed on the video display includes a marker formatted to allow the video content to be tracked and the video content to be identified;
the marker changes over time to allow a temporal position in the identified video content to be identified; and
the overlay content includes at least one of text, animations, graphic enhancements, advertisements, hyperlinks, and other information.

16. A device for augmenting video content, the device comprising:
a processor module;
a display coupled with the processor module;
a video camera coupled with the processor module, and configured to capture video data through an image sensor, including video content from a video display distinct from the device having at least one marker identifying a temporal position within the video content the temporal position corresponding to at least a portion of time in the video content; and
memory including instructions that, when executed by the processor module, cause the device to:
track the video content in the captured video data;
access overlay content responsive to the temporal position of the video content, the temporal position identified by the at least one marker; and
output the accessed overlay content with the tracked video content on the display.

17. A computer-implemented method for augmented video, the method comprising:
receiving video data captured through an image sensor of a video camera integrated into a mobile device, the video data including video content captured from a video display;
identifying the video content captured from the video display;
identifying a temporal position within the video content, the temporal position corresponding to at least a portion of time in the video content; and
accessing overlay content to be displayed over the video content, the overlay content selected based at least in part on the identified video content and the temporal position.

18. The computer-implemented method of claim 17, further comprising:
tracking the video content in the captured video data, wherein the tracking comprises identifying a relative position and orientation of the video content.

* * * * *